US006182026B1

(12) United States Patent
Tillmann et al.

(10) Patent No.: US 6,182,026 B1
(45) Date of Patent: Jan. 30, 2001

(54) METHOD AND DEVICE FOR TRANSLATING A SOURCE TEXT INTO A TARGET USING MODELING AND DYNAMIC PROGRAMMING

(75) Inventors: Christoph Tillmann, Aachen; Stephan Vogel, Köln; Hermann Ney, Aachen, all of (DE)

(73) Assignee: U.S. Philips Corporation, New York, NY (US)

( * ) Notice: Under 35 U.S.C. 154(b), the term of this patent shall be extended for 0 days.

(21) Appl. No.: 09/105,855

(22) Filed: Jun. 26, 1998

(30) Foreign Application Priority Data

Jun. 26, 1997 (EP) .................................. 97201959

(51) Int. Cl.[7] .............................. G06F 17/28; G10L 15/00
(52) U.S. Cl. ................................. 704/2; 704/256
(58) Field of Search .................... 704/2–8, 236, 704/241, 255, 256

(56) References Cited

U.S. PATENT DOCUMENTS

| 5,027,406 | * | 6/1991 | Roberts et al. | 704/251 |
|---|---|---|---|---|
| 5,228,110 | | 7/1993 | Steinbiss | 395/2 |
| 5,317,673 | * | 5/1994 | Cohen et al. | 704/232 |
| 5,510,981 | | 4/1996 | Berger et al. | 704/2 |
| 5,621,859 | * | 4/1997 | Schwartz et al. | 704/256 |
| 5,704,004 | * | 12/1997 | Roberts et al. | 704/243 |
| 5,724,593 | * | 3/1998 | Hargrave, III et al. | 704/5 |
| 5,768,603 | * | 7/1998 | Brown et al. | 704/2 |
| 5,787,198 | * | 7/1998 | Agazzi et al. | 382/196 |
| 5,805,832 | * | 9/1998 | Brown et al. | 704/2 |
| 5,850,561 | * | 12/1998 | Church et al. | 704/10 |
| 5,867,811 | * | 2/1999 | O'Donoghue | 704/2 |
| 5,907,821 | * | 5/1999 | Kaji et al. | 704/2 |
| 5,930,746 | * | 7/1999 | Ting | 704/9 |

OTHER PUBLICATIONS

"The Candide System for Machine Translation", by A.L. Berger et al., ARPA Human Language Technology Workshop, Mar. 1994, pp. 152–157 (Morgan Kauffmann Publishers, San Mateo, CA).

"The Mathematics of Statistical Machine Translation Parameter Estimation", by P.F. Brown et al, Computational Linguistics, vol. 19.2, pp. 263–311.

* cited by examiner

*Primary Examiner*—Forester W. Isen
*Assistant Examiner*—Patrick N. Edouard
(74) *Attorney, Agent, or Firm*—Daniel J. Piotrowski (57) ABSTRACT

For translating a word-organized source text into a word-organized target text through mapping of source words on target words, both a translation model and a language model are used. In particular, alignment probabilities are ascertained between various source word & target word pairs, whilst preemptively assuming that alignment between such word pairs is monotonous through at least substantial substrings of a particular sentence. This is done by evaluating incrementally statistical translation performance of various target word strings, deciding on an optimum target word string, and outputting the latter.

9 Claims, 6 Drawing Sheets

| | c u, a n t | v a l e | u n a | h a b i t a | d o b l e | p a r a | d o s i e c i, | d, i a s |
|---|---|---|---|---|---|---|---|---|
| days | . | . | . | . | . | . | . | o |
| two | . | . | . | . | . | . | o | . |
| for | . | . | . | . | . | o | . | . |
| room | . | . | . | o | . | . | . | . |
| double | . | . | . | . | o | . | . | . |
| a | . | . | o | . | . | . | . | . |
| is | . | o | . | . | . | . | . | . |
| much | . | . | . | . | . | . | . | . |
| how | o | . | . | . | . | . | . | . | o
n

FIG. 2b

| | e n | l a | h a b i t a c i, | h a c e m a s i a d o | d e r, | f r, i o e n | |
|---|---|---|---|---|---|---|---|
| room | . | . | o | . | . | . | |
| the | . | o | . | . | . | . | |
| in | o | . | . | . | . | . | |
| cold | . | . | . | . | . | o | |
| too | . | . | . | . | o | . | |
| is | . | . | . | . | . | . | |
| it | . | . | . | o | . | . | | o
n

FIG. 2c

```
  .  |
May   |  .   .   .   .   .   .   .   .   .   .   o
of    |  .   .   .   .   .   .   .   .   .   o   .
fourth|  .   .   .   .   .   .   .   .   o   .   .
the   |  .   .   .   .   .   .   .   o   .   .   .
you   |  .   .   .   .   .   o   .   .   .   .   .
- - - - - - - - - - - - - - - - - - - - - - - - -
offer |  .   .   .   .   .   .   .   .   .   o   .
not   |  .   .   .   .   .   o   .   .   .   .   .
can   |  .   .   o   .   .   .   .   .   .   .   .
I     |  .   .   .   o   .   .   .   .   .   .   .
- - - - - - - - - - - - - - - - - - - - - - - - -
case  |  .   o   .   .   .   .   .   .   .   .   .
this  |  .   o   .   .   .   .   .   .   .   .   .
In    |  o   .   .   .   .   .   .   .   .   .   .
- - - - - - - - - - - - - - - - - - - - - - - - -
         |   |   |   |   |   |   |   |   |   |   |
         In  Fall    ich     nicht   vierten anbieten
           diesem kann   Ihnen   den     Mai
```

FIG. 4a

```
  .   |                                           o
May   |  .   .   .   .   .   .   .   .   .   o   .
of    |  .   .   .   .   .   .   .   .   o   .   .
fourth|  .   .   .   .   .   .   .   o   .   .   .
the   |  .   .   .   .   .   .   o   .   .   .   .
you   |  .   .   .   .   .   o   .   .   .   .   .
- - - - - - - - - - - - - - - - - - - - - - - - -
offer |  .   .   .   .   .   .   .   .   .   o   .
not   |  .   .   .   .   .   .   .   .   o   .   .
can   |  .   .   .   o   .   .   .   .   .   .   .
I     |  .   .   .   o   .   .   .   .   .   .   .
- - - - - - - - - - - - - - - - - - - - - - - - -
case  |  .   o   .   .   .   .   .   .   .   .   .
this  |  .   o   .   .   .   .   .   .   .   .   .
In    |  o   .   .   .   .   .   .   .   .   .   .
- - - - - - - - - - - - - - - - - - - - - - - - -
         |   |   |   |   |   |   |   |   |   |   |
         In  Fall    ich     den     Mai     anbieten
           diesem kann   Ihnen   vierten nicht
```

FIG. 4b

```
         |  .    .    .    .    .    .    .    .    .    .    .    o
case     |  .    .    .    .    .    .    .    .    o    .    .    .
this     |  .    .    .    .    .    .    .    o    .    .    .    .
In       |  .    .    .    .    .    .    o    .    .    .    .    .
May      |  .    .    .    .    .    o    .    .    .    .    .    .
of       |  .    .    .    .    .    .    .    .    .    .    .    .
fourth   |  .    .    .    .    o    .    .    .    .    .    .    .
the      |  .    .    .    o    .    .    .    .    .    .    .    .
you      |  .    .    o    .    .    .    .    .    .    .    .    .
         |_ _ _ _ _ _ _ _ _ _ _ _ _ _ _ _ _ _ _ _ _ _ _ _ _ _ _ _ _
offer    |  .    .    .    .    .    .    .    .    .    .    o    .
not      |  .    .    .    .    .    .    .    .    .    o    .    .
can      |  .    o    .    .    .    .    .    .    .    .    .    .
I        |  o    .    .    .    .    .    .    .    .    .    .    .
_ _ _ _ _|_ _ _ _ _ _ _ _ _ _ _ _ _ _ _ _ _ _ _ _ _ _ _ _ _ _ _ _ _
            |    |    |    |    |    |    |    |    |    |    |    |
           Ich      Ihnen     vierten    in        Fall      anbieten
               kann      den        Mai      diesem     nicht
```

METHOD AND DEVICE FOR TRANSLATING A SOURCE TEXT INTO A TARGET USING MODELING AND DYNAMIC PROGRAMMING

BACKGROUND OF THE INVENTION

The invention relates to a method as recited in the preamble of claim 1. Various earlier translation methods have been designed. A relatively simple procedure is to use a translation code book, wherein each source item, such as a word or a phrase, maps on a single destination item. Such method is only useful for simple situations. A higher level method has been disclosed in [Berger & Brown +94] A. L. Berger, P. F. Brown, J. Cocke, S. A. Della Pietra, V. J. Della Pietra, J. R. Gillett, J. D. Lafferty, R. L. Mercer, H. Printz, L. Ures: "The Candide System for Machine Translation", ARPA Human Language Technology Workshop, Plainsboro, N.J., Morgan Kaufmann Publishers, San Mateo, Calif., pages 152–157, March 1994. [Brown & Pietra +93] P. F. Brown, S. A. Della Pietra, V. J. Della Pietra, R. L. Mercer: "Mathematics of Statistical Machine Translation: Parameter Estimation", Computational Linguistics, Vol. 19.2, pages 263–311, June 1993. It appears that the models governing the various word sequences could be improved upon, which also should allow raising the efficiency of the search procedures. In addition, there is a need for more simple procedures that will still cater to a high percentage of texts of intermediate complexity. Now, the present inventors have recognized the potential of dynamic programming and the technology of Hidden Markov Modelling that both have been used for speech recognition, as well as recognized various aspects that speech recognition and text translation in have in common.

SUMMARY TO THE INVENTION

In consequence, amongst other things, it is an object of the present invention to use technology that has been applied to speech recognition, and now apply it in a wider context to text translation. Now therefore, according to one of its aspects the invention is characterized by the steps as recited in the characterizing part of Claim 1. It has been found that this new field of application of dynamic programming necessitates only a relatively low level of operational complexity, while the results have been found excellent.

By itself, the use of dynamic programming in speech recognition technology has been disclosed in a series of earlier patents and patent applications assigned to the present assignee, such as U.S. Pat. No. 5,228,110, U.S. Ser. No. 08/425,304 (PHD 91136), U.S. Ser. No. 08/312,495 (PHD 91137), U.S. Ser. No. 08/563,853 (PHD 91138), U.S. Ser. No. 08/203,105 (PHD 93034) and U.S. Ser. No. 08/587,190 (PHN 15167).

The invention also relates to a device arranged for implementing the method as recited supra. Further advantageous aspects of the invention are recited in dependent Claims.

BRIEF DESCRIPTION OF THE DRAWING

These and further aspects and advantages of the invention will be discussed more in detail hereinafter with reference to the disclosure of preferred embodiments, and in particular with reference to the appended Figures and Tables, that show:

FIGS. 2–2c, various examples of word alignments for Spanish-English sentence pairs;

Table 1, a DP based search algorithm for the monotonous translation model;

Table 2, the effect of the transformation on the vocabulary size in two languages;

Table 3, word error rates and sentence error rates for various transformation steps;

Table 4, language model perplexity and error rates for various language models.

DETAILED DESCRIPTION OF PREFERRED EMBODIMENTS

The invention wants to translate a text, in particular a sentence that is written in a source language, into a sentence written in a target language. By way of non-limitative example, the disclosure infra, considers indogermanic languages such as French, Spanish and English. Inasmuch as these languages have a certain similarity in character, word-to-word translation has proven to be quite useful, but it is assumed that the procedures described herein will also have merit between languages of more distant character. Now, a source sentence is $f_1^J = f1, f2, \ldots, fJ$, that may be translated into a target sentence $e_1^I = e1, e2, \ldots eI$. Among all possible target strings, the procedure followed herein will choose the one with the highest probability, which is given by Bayesian decision rules according to: $e_1^I = \mathrm{argmax}(e_1^I)\{Pr(e_1^I|f_1^J)\} = \mathrm{argmax}(e_1^I)\{Pr(e_1^I) * Pr(f_1^J|e_1^I)\}$.

Herein, $Pr(e_1^I)$ is the language model of the target language, whereas $\{Pr(e_1^I|f_1^J)\}$ is the string translation model which has as principal parts the transition probability and the lexicon probability. Various additional measures are as follows:

- the introducing of structures into the probabilistic dependencies for modelling the string translation probability model $Pr(f_1^J|e_1^I)$;
- an algorithm to execute the above argmax operation in an efficient manner;
- and the use of transformation steps for both source and target languages to improve the translation process; in particular these transformation steps may vary appreciably with the language pair considered.

Figure 1:
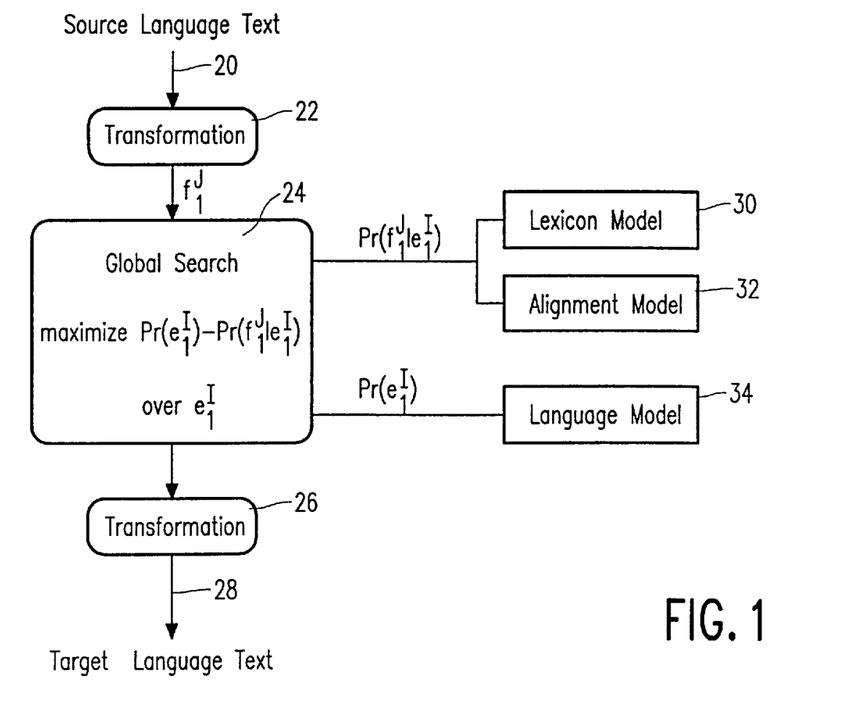
FIG. 1, a translation architecture based on Bayesian decision theory.

FIG. 1 shows a general translation architecture based on Bayesian decision theory. The procedure may be executed on standard hardware with sufficient facilities in terms of storage space for data and program, processing power, and I/O; for brevity such standard hardware has not been further disclosed herein. First at 20, the translation receives a source language text that is provided with interpunctions, so that the successive sentences are clearly delimited. In other situations, this interpunction may be absent, such as in the case of provisionally recognized speech. Next in block 22, the text is converted into the source string $f_1^J$, for letting the structure of the source text become more similar to that of the eventual target text. Through the lexicon model 30 and the language model 32, the transition probability $Pr(f_1^J|e_1^I)$ is generated. Furthermore, language model 34 is used to present the string translation model $Pr(e_1^I)$. In block 24, a global search is executed, that maximizes $\{Pr(e_1^I) - Pr(f_1^J|e_1^I)\}$ over $e_1^I$. The result is sent to transformation block 26 that generates the sequence of target words. Often, the latter transformation would need some reordering of the target words, in a manner that is similar but inverse to the one used in block 22. Finally, the target language text is outputted on line 28.

A key issue in modelling the string translation probability $\Pr(f_1^J|e_1^I)$ is the defining of the correspondence between word pairs in the source and target sentences. A straightforward constraint is to assign one source word to exactly one target word. The procedure uses a monotonous HMM alignment and associated Dynamic Programming.

Figure 2A:
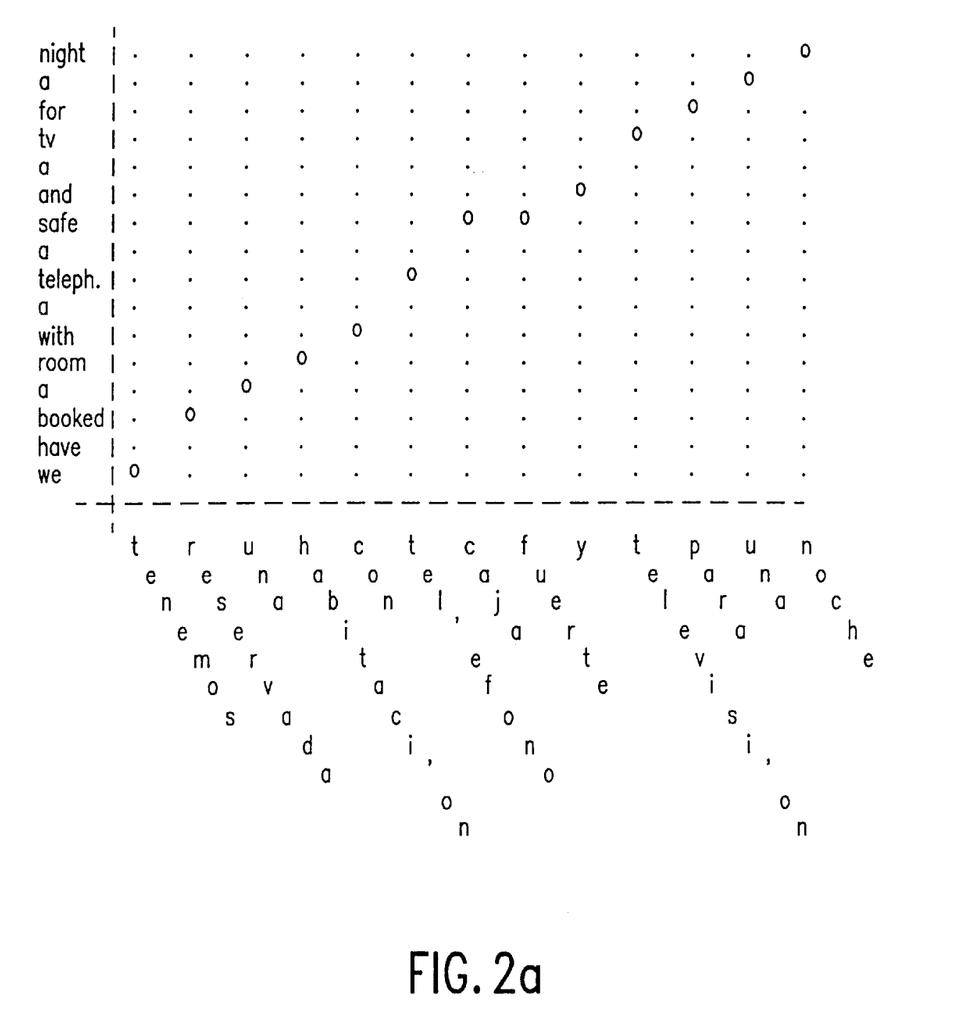
Figure 2B:
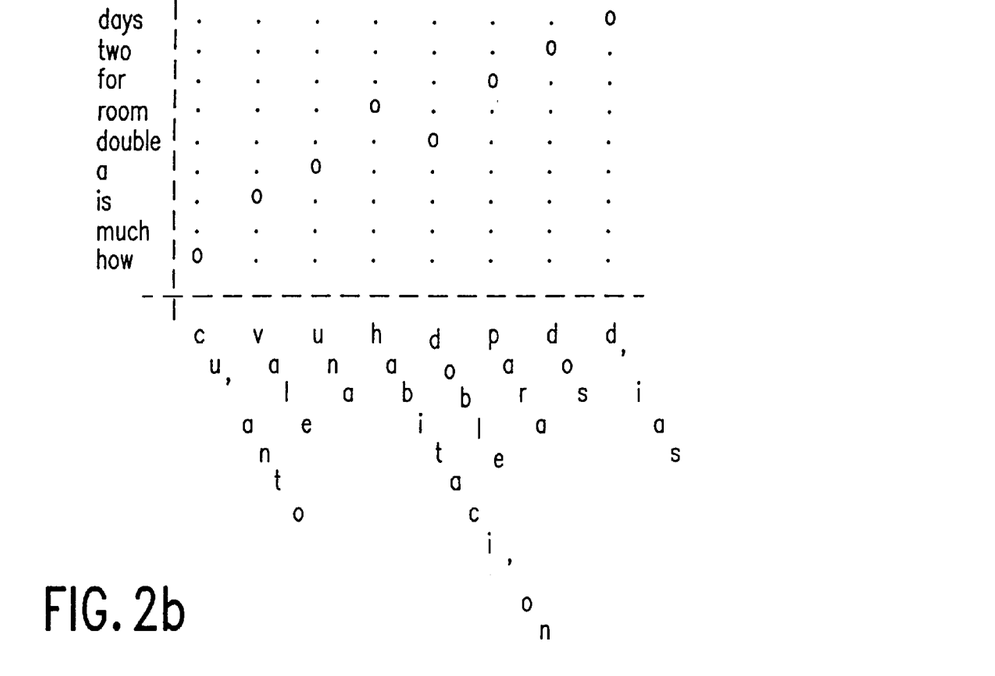
Figure 2C:
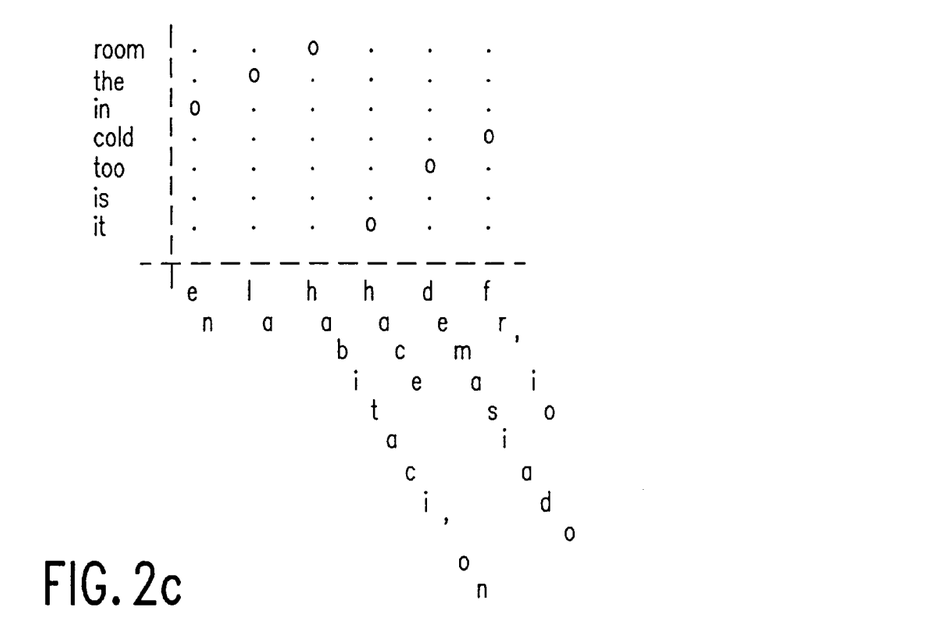

FIG. 2 shows various examples of word alignments for Spanish-to-English translation. In FIG. 2a, the monotonicity of the source text versus the target text is good. The discrepancy is caused by the joining or splitting among words in either one of the two languages. In FIGS. 2b, 2c, the monotonicity is less strict, through inversions between two words, and through inversions between sentence parts that each have a series of words, but on their own retain forward or reverse monotonicity. Further, the difference in position indices is usually less than 3 in these short sentences. Similarly, FIGS. 4a–4c, 5a, 5b show examples of word alignments for English-German Clause pairs of the cases Main, Subordinate, and Interrogative Clause cases. Here, the meaning of the sentence may be invariant under various types of inversions.

Figure 3:
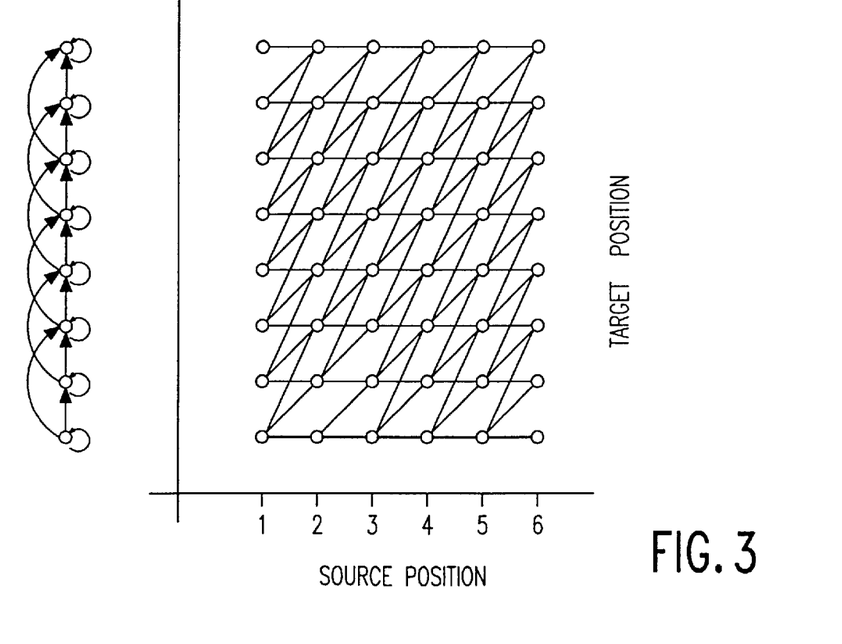
FIG. 3, illustration of alignments for the monotonous Hidden Markov model.
Figure 4A:
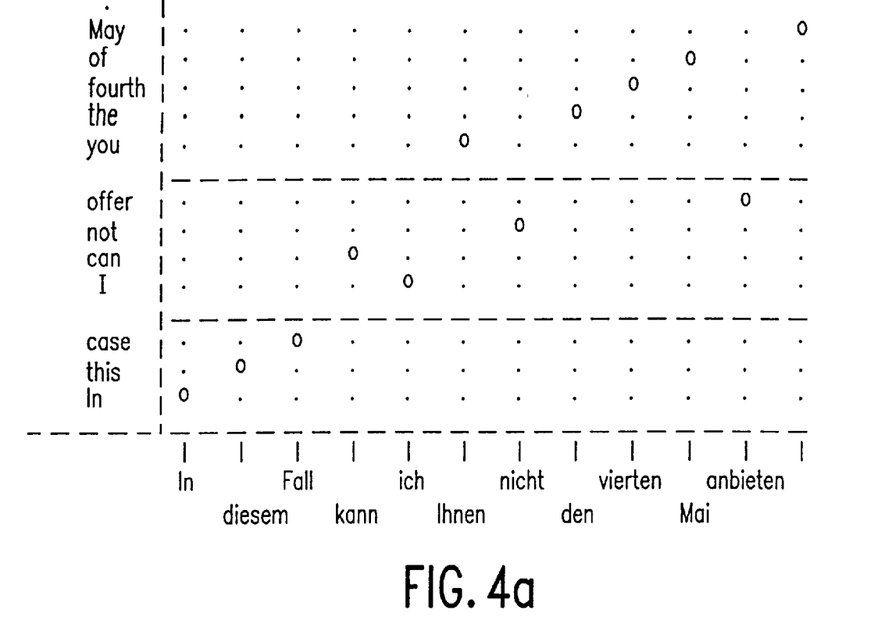
FIGS. 4a–4c examples of word alignments for English-German Main Clauses pairs.
Figure 4B:
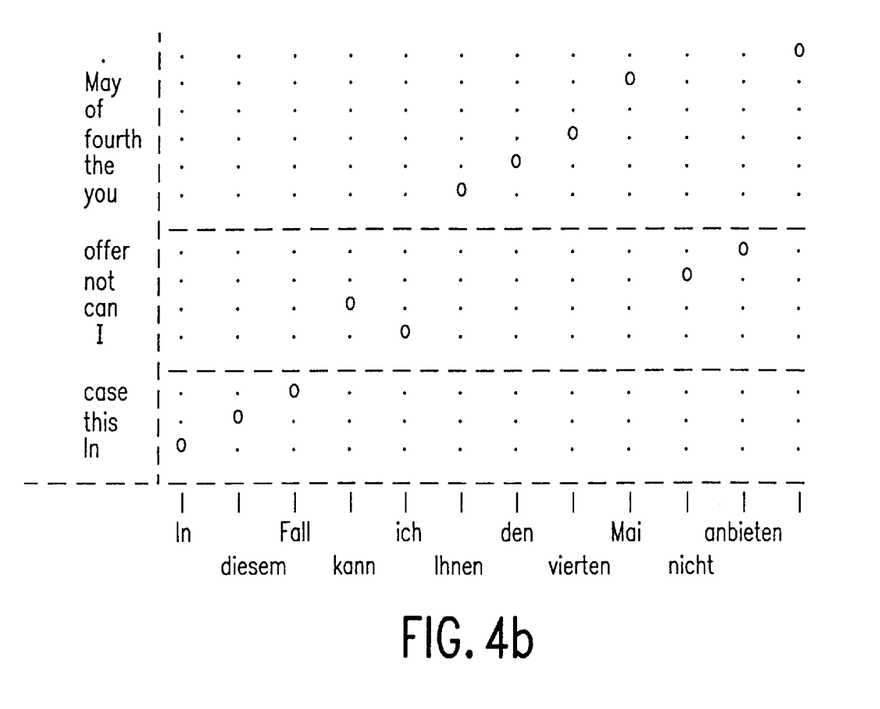
Figure 4C:
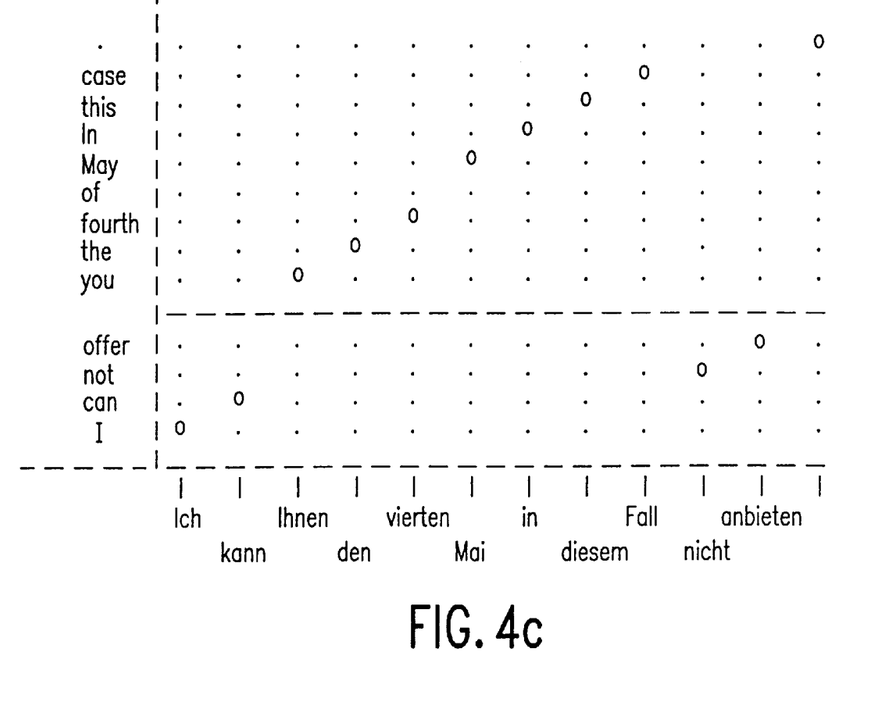
Figure 5A:
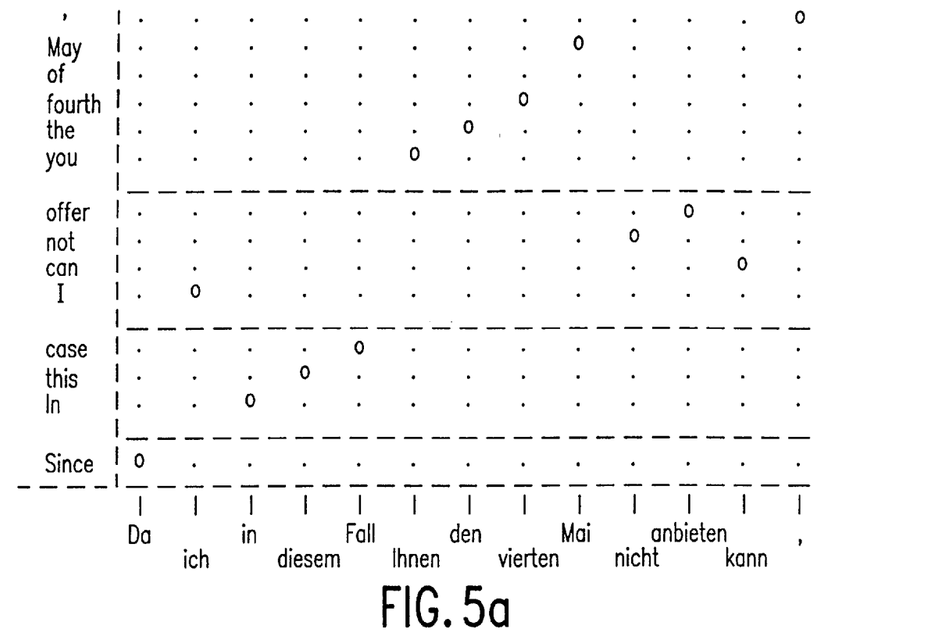
FIGS. 5a–5b examples of word alignments for English-German Subordinate and Interrogative Clause pairs.
Figure 5B:
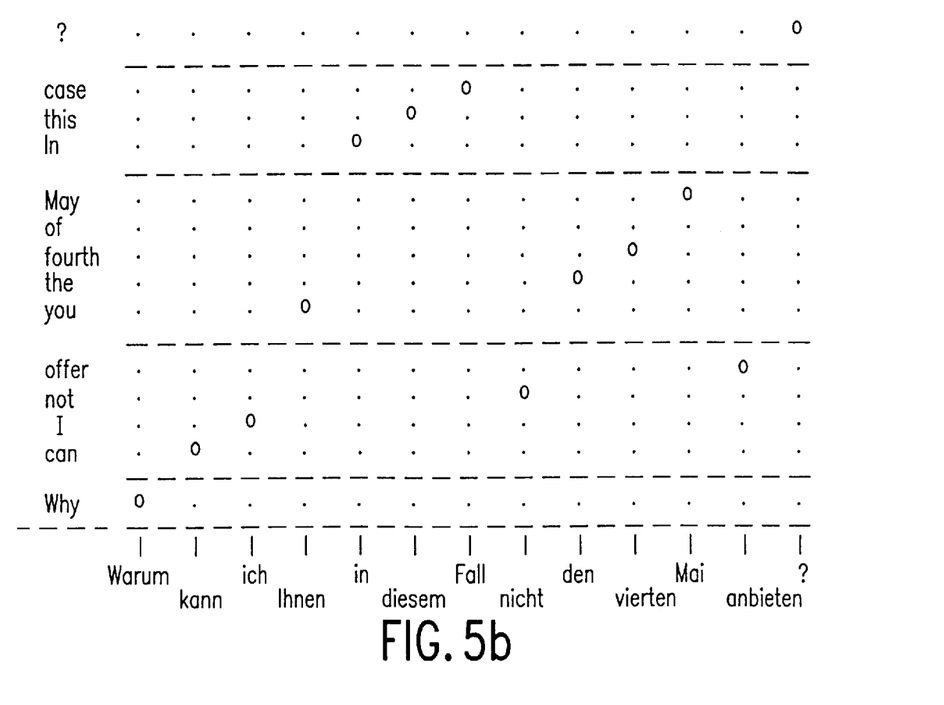

FIG. 3 illustrates various alignments used in the monotonous Hidden Markov Model. In analogy with speech recognition, we must identify the states along the vertical axis with the positions i of the target words ei, and the time with the positions j of the source words fj. Training of the alignment model and lexicon model uses the maximum likelihood criterion in the so-called "maximum approximation", that covers only the most likely alignment.

The invention preemptively assumes motonicity between source and target languages, that is, as the source position advances by one, the target position may remain the same, for example, because two source words map on a single target word, or the target position jumps by one, in case of one-to-one translation in a word pair, or the target position jumps by two positions, in that a source word translates into two target words. Possible remedial measures for more complex situations as in FIGS. 2, 4, 5, will be discussed hereinafter.

Optimum alignment is found by dynamic programming according to the recursion:

$$Q(i,j) = p(f_j|e_i) \max_{i'}[p(i|i') \cdot Q(i',j-1)]$$

wherein $Q(i,j)$ is a partial probability, similar to that used for time alignment for speech recognition. Further, p is a specific probability distribution that follows from the actual expression. Thus, the training procedure is a series of iterations that each have two substeps:
  a position alignment that finds the most likely alignment as based on the model parameters;
  estimating maximum likelihood of the model parameters along the alignment path for all sentence pairs; for model-free distributions the estimates are relative frequencies.

The baseline search method uses the monotonicity assumption, which leads to the overall search criterion:

$$\max_{e_1^I, a_1^J} \prod_{j=1}^{J} \left[ p(a_j|a_{j-1}) \cdot p_{[a_j - a_{j-1}]}(e_{a_j}) | e_{a_{j-1}} \right) \cdot p(f_j|e_{a_j}) \right]$$

Herein, for a particular source position i, a first aspect of the search outcome should be ai, that is the position of the target word in FIG. 3. In the formula, this is exclusively dependent on the preceding position. A second aspect of the search outcome should be $e_{a_j}$, that is the identity of the target word that should occupy the target position, finding the unknown mapping $$j \to (a_j, e_{a_j}),$$

which defines a path through a network with a uniform trellis structure. Using this formulation of the search task, we use dynamic programming (DP) to find the best path through the lattice. To this purpose, we introduce the auxiliary quantity $Q(i,j,e)$: the probability of the best partial path which ends in the grid point $(i,j,e)$. Since we have only first-order dependencies in our model, it follows that the auxiliary quantity must satisfy the following DP recursion equation:

$$Q(i, j, e) = p(f_j|e) \cdot \max_{\delta, e'} \{p(i|i-\delta) \cdot p_\delta(e|e') \cdot Q(i-\delta, j-1, e')\}.$$

To explicitly construct the unknown word sequence $e_1^I$, it is convenient to use so-called backpointers which for each grid point $(i,j,e)$ store the best predecessor grid point. The resulting complexity of the search algorithm is:

$$I_{max} \cdot J \cdot E^2$$

where $I_{max}$ is the estimated maximum length of the target sentence, J is the length of the given input sentence, and E is the vocabulary size for the target language.

As in speech recognition, so-called beam search may be used to evaluate the direct programming hypotheses by limiting to the locally most promising hypotheses $Q(i,j,e)$, as follows. We compute the best hypotheses at position j:

$$Q_{\max}(j) := \max_{i,e} Q(i, j, e)$$

and consider at position j for future extension only those hypotheses $Q(i,j,e)$ whose scores are close to the local maximum $Q_{max}(j)$; measured by a pruning threshold t with $0 < t < 1$ $$Q(i,j,e) < t \cdot Q_{max}(j).$$

To achieve the full speed-up by this beam search, it is implemented with care. Using this beam search concept, we can also tackle more complex search tasks like using trigram language models or special constraints for language modelling. The resulting complexity i:

$$\Delta I \cdot J \cdot \Delta E \cdot E$$

with
  $\Delta I$: average number of active positions i per j-position
  $\Delta E$: average number of active words e per (i,j)-pair.

Accelerated Dynamic Programming Recombination finds the best partial path to each gridpoint $(i,j,e)$: the arcs in the translation lattice leading to $(i,j,e)$ are processed in a specific order so that the computation can be stopped when it is sure that no better partial path to $(i,j,e)$ exists. By carrying out these computations at each gridpoint, it is guaranteed to find the best path through the lattice. Although the complexity of the algorithm is not guaranteed to be reduced in the worst case, significant computational savings are obtained in the average case. The details are as follows. For each successor word e, we store the best M predecessor words $e_1^{(\delta)} \ldots e_M^{(\delta)}$ in a list of candidates ranked by $p_\delta(e|e_i^{(\delta)})$, e.g. M=5. We expect the best score Q(i,j,e) for the gridpoint (i,j,e) to result from the M predecessor words and perform the optimization over this restricted set beforehand. The best score that results from the M predecessor words is denoted by Q̂(i,j,e,). To guarantee the optimality of the score Q̂(i,j,e), we sort the arcs leading to gridpoint (i,j,e) according to the scores of the predecessor gridpoints (i–δ, j–1,e'). For each gridpoint (i,j,e) we define an upper bound $ub_\delta(i,j,e)$ of the cost of an arc leading to that gridpoint. When processing the arcs in the specified order, the computation for the gridpoint (i,j,e) can be terminated whenever:

$$ub_\delta(i, j, e) < \frac{\hat{Q}(i, j, e)}{Q(i - \delta, j - 1, e')}.$$

The difference with beam search is that there is no loss of optimality, but the speed-up in CPU time is smaller than for beam search.

The latter accelerated expansion method is advantageous in combination with the beam search considered earlier. Whereas in beam search all possible successor words e have to be considered when extending an hypothesis (i,j,e'), we limit this extension to the most promising candidates e as follows.

The basic idea is to apply some preprocessing steps to the language model probabilities $p_\delta(e|e')$ and lexicon probabilities p(f|e). These preprocessing steps can be done offline and the results are stored in tables. For each source word f, we determine the set E(f) of target words e, which are close (in the sense of the beam threshold t) to the best target word:

$$E(f) := \left\{ e : \frac{p(f_j | e)}{\max_e p(f_j | e)} > t \right\}$$

For each predecessor word e', we determine the set E(e') of successor words e, which are close to the best successor word in the sense of the beam threshold t. We distinguish the cases δ=1 and δ=2.

$$E_\delta(e') := \left\{ e : \frac{p_\delta(e | e')}{\max_e p_\delta(e | e')} > t \right\}$$

In practice, the extension of a hypothesis (i,j,e') in beam search can be limited to the words e in the sets E(f$_j$) and $E_\delta$(e'). The resulting complexity of this method in combination with beam search is then:

$$\Delta I \cdot J \cdot \Delta E \cdot \tilde{E}$$

with

ΔI: average number of active positions i

ΔE: average number of active words e

Ẽ: average number of words in E(f) and $E_\delta$(e').

There are several refinements of this method:

We can use different pruning thresholds t in beam search and in the definition of the sets E(f) and $E_\delta$(e').

In anticipating pruning, additional speed up can be obtained by using sorted sets, i.e. lists that are sorted according to the probabilities (p(f$_j$|e) or $p_\delta$(e|e'), and by using an anticipated conservative estimate $\tilde{Q}_{max}(j)$ of the exact value of $Q_{max}(j)$ which is only known after all hypotheses (i,j–1,e') have been expanded. This estimate is continuously updated during the evaluation of new hypotheses. When the extension of the hypothesis (i,j–1,e') is done in the order of the lists, the evaluation can be stopped as soon as the first word e is encountered with a score $$Q(i,j,e) < t \cdot \tilde{Q}_{max}(j)$$

In practice, the monotony assumption is often not satisfied, as shown in FIGS. 2b, 2c, 4a, 4b, 4c, 5a, 5b.

This problem is relevant when the language pair considered has significant differences in the word order. For example, the position of the verb in German and English can be dramatically different. To counteract this problem, a parsing algorithm example may be applied to the input sentence. As a result of this parsing, we know the subject, the verb and the other syntactic parts of the sentence. Using this information, we may reorder the input sentence such that its word order matches better the word order in the target language.

In more general situations, there will always be sentence pair, with word alignment that do not satisfy the monotonicity constraint. Even then, however, for most of the words the monotonicity constraint is satisfied locally. Therefore, the following extensions are provided. Firstly, a more systematic preprocessing is undertaken to local and global word reorderings to try to produce the same word order before and after the translation proper. Secondly, a multi-level approach is undertaken that allows a small number, such as 4 "large" forward and backward transitions. Within each level separately, the monotonous alignment model is still put into use. Only when moving from one level to the next, we need to handle the problem of different word sequence orders.

The parsing algorithms referred to above are never perfect. Therefore, we may consider an approach where the word reordering is taken care of in the translation process itself, i.e. the search procedure.

FIGS. 4a, 4b, 4c and 5a, 5b show examples for German-English alignments. In FIG. 4 the same German main declarative clause is shown in different word orders. FIG. 5 shows the effect of subordination and question forming (interrogative clause) on the word order. In both Figures, we see that the most affected part is always the word of the verb group, i.e. the words I, can, not, offer In the English sentences, we have always the same word order:

I can not offer apart from the question sentence where we have an exchange of the words I and can. To integrate this word reordering into our search, we first define the syntactic parts:

S: subject pronoun, i.e. I, he, . . .

M: modal verb, e.g. can, does, has, . . .

N: negation, e.g. not, or no negation at all

V: infinite verb, e.g. help, come, . . .

C: subordinating conjunction, e.g. since, while, if, . . .

W: interrogative pronoun or adverb, e.g. where, when, what, . . .

With these syntactic parts, we may define sentence patterns for the various sentence types:

main clause: SM*NV$, *MS*N*V$ subordinate clause: CS*N*VM, interrogative clause: WMS*N*M?

other clauses: . . .

where the symbol '$' stands for the punctuation mark the symbols ',?' represent the question mark and the comma, and the symbol '*' denotes an arbitrary word string including the empty string, and is made from any word apart from the above defined syntactic parts. With these sentence patterns, the dynamic programming beam search may be modified as follows:

For the verb group, we use a position unigram language model rather than the usual bigram model:

p(e|y), y=S,M,N,V.

The reason is that since the word order for the words of the verb group is different for German and English, it is hard to apply the bigram language model.

The DP beam search is extended in such a way that
a) we distinguish various segments in the target sentence, e.g. segment before the verb group (bigram language model), e.g. the verb group (position unigram language model), e.g. segment after the verb group (bigram language model),
b) the search hypotheses are distinguished with respect to both the segments and the word positions of the verb group.

The DP recombination equations must be modified suitably.

In general, due to these modifications, the size of the total search space may grow by a factor of 100 or more. But using the beam search concept, we may expect a much smaller increase for the actual search effort, just like in large-vocabulary speech recognition.

So far we have assumed written input, i.e. perfect input with no errors. When trying to apply the same translation concept to spoken input, we are faced with the additional complication that the spoken words can never be recognized with 100% security. Yet, we may undertake to integrate the probabilities of the speech recognition process into the translation process.

To this purpose, we consider various methods of increasing complexity for taking into account both the acoustic probabilities $p(x_j|f_j)$ and the language model probabilities $p(f|f')$; wherein f relates to the source text words.

The ambiguity caused by the acoustic probabilities can be integrated into the translation search directly by computing the new quantities:

$$p(x_j|e) := \sum_f p(f|e) \cdot \frac{p(x_j|f)}{p(x_j|f_j)}$$

which replace the lexicon probabilities $p(f_j|e)$ in the dynamic programming equation. This computation can be done offline, so it does not affect the search complexity. However, it could be done on line, because the new quantities are less focused than the original lexicon probabilities and thus may result in more search hypotheses.

In the above, the denominator $p(x_j|f_j)$ may be put before the sum; as a constant factor for all hypotheses in position j, it does not affect the DP decisions and may thus be ignored.

Taking also the language model $p(f|f')$ into account is more difficult because there is a dependence on both preceding and succeeding words. Therefore we may simplify to refer only to the single best recognized sentence $f_1^J = f_1 \ldots f_j \ldots f_J$. Then the joint effect of the acoustic probabilities $p(x_j|f_j)$ and the language model probabilities $p(f|f')$ can be taken into account by defining the quantities:

$$p(x_j|e) := \sum_f p(f|e) \cdot \frac{p(x_j|f)}{(p(x_j|f_j)} \cdot \frac{p(f|f_{j-1})}{p(f_j|f_{j-1})} \cdot \frac{p(f_{j+1}|f)}{p(f_{j+1}|f_j)}$$

The approximation can be improved by making use of the so-called forward-backward probabilities of the word graph so that not only the single best, but all 'good' word sequences with high enough probability scores can be taken into account.

Note again that, in the above definition, the denominator product $p(x_j|f_j) \cdot p(f_j|f_{j-1}) \cdot p(f_{j+1}|f_j)$ does not affect the DP decisions and can be ignored.

To simplify the discussion, we have so far assumed that the word boundaries are correct. This assumption can be weakened by including the optimization over the word boundaries as they are given by a word lattice or word graph. A simple approximation would be to use n-best lists computed from the word graphs and do a separate translation for each of the n best sentence candidates.

In this context, Table 1 shows a DP based search algorithm for the monotonous translation model, more or less formulated in pseudo-code. On line 42, the source string of words is received. On line 44 the translation process is initialized, which is generally done for each new sentence. On line 46 a loop structure is started. On lines 50, 52, further nested loops are entered. Line 52 carries the body of the procedure in question. Line 56 finds the best end hypothesis and line 58 recovers the optimum target word sequence.

As an additional measure, text transformation (block 22 in FIG. 1) makes the two languages resemble each other as closely as possible regarding sentence length and word order. Further preprocessing steps, in particular for a hotel room reservation system, are all or part of the following:

Reduce the dictionary size by replacing various specific word categories, such as surnames, male and female given names, various number categories, such as room numbers, dates, times-of-day, names of months and days of week by category markers;

Punctuation marks are treated like regular words;

Single words replace certain politeness frases, and may be shifted to any end of the sentence;

Personal pronouns may form part of an inflected verb; this phenomenon is counteracted by splitting the verb into a verb part and a pronoun part;

Words are reordered such as particular noun-adjective combinations, and phrases that have particular positions of other pronouns. Table 2 gives a clear indication of the dictionary size reduction.

Table 3 lists word error rates and sentence error rates for various transformation steps; the greatest improvement is attained by combining all transformations. The most important transformations are categorization and word joining. Deletion errors (DEL) are often caused by the omitting of word groups like "for me please" and "could you". The eventual outcome of the machine translation shows, that the semantic meaning of the source text is often preserved even if there are a few errors with respect to the exact translation.

Table 4 shows language model perplexity and error rates for three language models, in particular a zerogram, a unigram, and a bigram language model. The improvement is clear.

Appendix 1

TABLE 1

DP based search algorithm for the monotone translation model.

| input: source string f1... fj... fJ | 42 |
| initialization | 44 |
| for each position j = 1, 2, ..., $I_{max}$ in target sentence do | 46 |
|   for each position i = 1, 2, ..., $I_{max}$ in target sentence do | 48 |
|     for each targer word e do | 50 |
|       $Q(i, j, e) = p(f_j\|e) \cdot \max_{\delta, e'}\{p(\delta\|i-\delta) \cdot p\delta(e\|e') \cdot Q(i-\delta, j-1, e')\}$ | 52 |
| traceback: | 54 |
|   — find best end hypothesis: $\max_{i,e} Q(i, J, e)$ | 56 |
|   — recover optimal word sequence | 58 |

TABLE 2

Effect of the transformation steps on the vocabulary sizes in both languages

| Transformation Step | Spanish | English |
|---|---|---|
| Original (with punctuation) | 692 | 518 |
| + Categorization | 416 | 227 |
| + 'par favor' | 417 | — |
| + Word Splitting | 374 | — |
| + Word Joining | — | 237 |
| + Word Reordering | — | — |

Appendix 2

TABLE 3

| | Translation Errors [%] | | |
|---|---|---|---|
| Transformation Step | INS/DEL | WER | SER |
| Original Corpora | 4.3/11.2 | 21.2 | 85.5 |
| + Categorization | 2.5/9.6 | 16.1 | 81.0 |
| + 'par favor' | 2.6/8.3 | 14.3 | 75.6 |
| + Word Splitting | 2.5/7.4 | 12.3 | 65.4 |
| + Word Joining | 1.3/4.9 | 7.3 | 44.6 |
| + Word Reordering | 1.9/3.4 | 5.1 | 30.1 |

TABLE 4

Language model perplexity (PP), word error rates (INS/DEL, WER) sentence error rates (SER) for different language models.

| Language | | Translation Errors [%] | | |
|---|---|---|---|---|
| Model | PP | INS/DEL | WER | SER |
| Zerogram | 237.0 | 0.6/18.6 | 31.1 | 98.1 |
| Unigram | 74.4 | 0.9/12.4 | 20.4 | 94.8 |
| Bigram | 4.1 | 0.9/3.4 | 5.1 | 30.1 |

What is claimed is:

1. A method for translating a received source text into a target text through mapping source words on target words, wherein said method comprising the steps of:

ascertaining alignment probabilities between source word and target word pairs;

assuming that alignment between such word pairs is monotonous through at least substantial substrings of a particular sentence;

evaluating, using a Hidden Markov Model and accelerated dynamic programming recombination, statistical translation performance of various target word strings; and deciding on an optimum target word string.

2. The method as claimed in claims 1, wherein the translating a received source text into a target text uses Bayesian Decision Theory.

3. The method as claimed in claims 1, wherein the translating a received source text into a target text uses a dynamic programming beam search.

4. The method as claimed in claim 1, wherein the translating a received source text into a target text uses accelerated dynamic programming recombination.

5. The method as claimed in claim 1, further including the step of reordering the word sequence of the source sentence.

6. The method as claimed in claim 1, further including the step of integrating a word reordering into a dynamic programming search.

7. The method as claimed in any of claim 1, furthermore integrating with a speech recognition method.

8. The method as claimed in claim 1, furthermore comprises a preprocessing step for executing at least one of the following reductive measures:

replacing selective word categories, treating punctuation marks like regular words, replacing certain politeness phrases by single words, counteracting the phenomenon that personal pronouns may form part of an inflected verb, by splitting the verb into a verb part and a pronoun part;

recording words and phrases that have particular positions of other pronouns.

9. A device for implementing the method as claimed in claim 1.

* * * * *